Patented June 19, 1928.

1,674,402

UNITED STATES PATENT OFFICE.

LEON LILIENFELD, OF VIENNA, AUSTRIA.

CELLULOSE THIOURETHANE ESTERS AND ETHERS AND PROCESS FOR MAKING SAME.

No Drawing. Application filed September 17, 1925, Serial No. 57,016, and in Austria October 11, 1924.

By the present invention new cellulose compounds are produced by causing an ester of an inorganic acid to react with a salt of an N-substituted or not substituted thiourethane (thiocarbamic acid esters or xanthic amides) of cellulose, or with an N-substituted or not substituted thiourethane of cellulose, in presence of a basic substance, particularly an alkali.

The products have different properties in accordance with the working conditions, particularly with the nature and the proportion of the inorganic acid ester used. In illustration I give here the properties of some categories of the new cellulose compounds which show particularly marked differences in their properties, especially their behaviour to solvents. To the first category belong compounds which dissolve only in basic solvents, like aqueous alkalies, aqueous pyridine solutions and aqueous solutions of organic amines. To the second category belong compounds which dissolve in aqueous alkali solutions and in aqueous solutions of organic bases, and also in other organic solvents, such as strong acetic acid, aqueous alcohol and the like. The third category includes compounds which are insoluble in aqueous alkali solution but dissolve in a very large number of organic solvents. The compounds of all the categories have in common the property of insolubility in water at any temperature.

The solutions of the new cellulose derivatives can be worked up, either by drying or precipitation or coagulation with the aid of a suitable precipitant, into valuable technical products, for example plastic masses of all kinds, such as substitutes for celluloid, horn, ebonite, ivory, glass, tortoise shell, wood and the like; varnishes, lacquers, layers of all kinds; skins (including photographic films); artificial fibres and threads, particularly artificial silk; adhesives and cements; finishes and coatings of all kinds on textile threads and fabrics, paper, leather and the like; water-proof materials, substitutes for wax-cloth and oil-cloth; artificial leather; bed sheets; bookbinder's cloth, tracing cloth; electrical insulation masses and the like.

The expression "artificial materials" used in the specification and in the claims includes all the artificial materials mentioned in the preceding paragraph. The term artificial material as used in the following claims is used in the further sense that it is intended thereby to exclude the esters of the thiourethanes as chemical compounds per se but is designed to include matter made from or including the esters.

In the manufacture of these new cellulose compounds the working conditions may be varied within wide limits. For this reason the invention so far as it concerns its essential feature is not to be confined to the details of the following exposition or the examples which illustrate it.

One mode of carrying out the manufacture consists in converting, for example, an N-substituted thiourethane of cellulose or of a conversion product or derivative of cellulose (made for example by the process described in patent application Ser. No. 727,805) or a not substituted thiourethane (such as is made for example as described in patent application Ser. No. 727,806) in crude condition, or in a condition purified by any suitable method, into a salt (for example a silver salt, by treating an ammoniacal solution of an N-substituted thiourethane which is soluble in ammonia, with ammoniacal silver nitrate solution or an alkali metal salt or the like) and treating this salt with an alkyl-, aralkyl- or aryl-ester of an inorganic acid, in the cold or with aid of heat.

If an alkali metal salt is to be used the thiourethane may for example be dissolved in alkali solution and the latter brought together with the inorganic acid ester.

Or the thiourethane may be incorporated with the alkali in solid form (advantageously pulverized), or with a strong alkali solution (for example of 25–50 per cent strength), or with a mixture of solid caustic alkali with saturated alkali solution, for instance the dry or moist thiourethane may be rubbed or kneaded together with the solid alkali or the strong alkali solution or the mixture of solid caustic alkali with saturated alkali solution in an energetically acting mixing apparatus, such as a mill, kneading machine, breaker, edge runner, or the like.

The alkali can be used in the calculated proportion or in excess thereof (calculated on the thiourethane or on the ester of the inorganic acid or on both).

Inorganic acid esters suitable for the manufacture are halogen esters (halogen-alkyls, halogen-aralkyls, halogen-aryls), sulphuric acid esters, phosphoric acid esters or the like. The ester may be undiluted or diluted with suitable solvents (such as benzol, benzene or the like).

The final product of the reaction may be isolated when the operation has been carried out in solution by separating by filtration, straining, centrifuging or the like from the mother liquor, washing with water and drying; or it may be dissolved and applied to technical purposes either after previous separation of the bulk of the washing water by pressing, centrifuging or the like, or after previous drying. The precipitate may be treated before or after washing with a dilute acid (for example sulphuric acid of 5–10 per cent strength) and then washed and dried.

If the operation is not conducted in solution the final product may be worked up by mixing the reaction mixture after the reaction is completed with cold or hot water, collecting the undissolved final product on a suitable filtering apparatus, centrifuge or the like, and washing it with cold or hot water. The further working up may be conducted as described above.

From the mode of their formation the new cellulose compounds should be esters of N-substituted or not substituted thiourethanes of cellulose or esters of N-substituted imidothiolcarboxylic acids and would be represented by a formula (in which a cellulose-xanthanilide is taken as example) somewhat as follows:

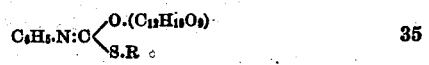

wherein R is the alkyl-, aralkyl- or aryl- radical introduced by the aforesaid reaction. The results of analysis make it probable that in many cases a secondary reaction occurs besides the main reaction and in this secondary reaction alkyl-, aralkyl- or aryl- groups are substituted for the free hydroxyl-hydrogen atoms of the cellulose component.

In all probability, the reaction between the salts of the N-substituted cellulose thiourethanes and the inorganic esters takes place according to the following equations in which, as an example, are taken the sodium salt of a cellulose xanthanilide and ethyl iodide:

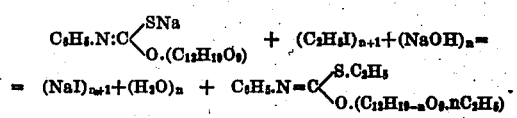

or

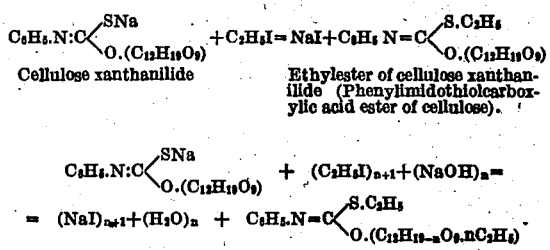

The following examples illustrate the invention the parts being by weight:—

*Example I.*—100 parts of a phenyl- or tolyl-thiourethane, made according to Example 1 or 2 or 6 (in the latter case without neutralizing the viscose or reaction mixture at all) of patent application Ser. No. 727,805, are dissolved in 4900 parts of a caustic soda solution of 10 per cent strength. The solution, filtered or strained if necessary, is mixed with 600–1000 parts of di-ethyl sulphate and the whole stirred or shaken. After about half an hour or an hour the final product of the reaction is precipitated. It is separated from the mother liquor immediately after there is no further precipitation, or after a longer time (1–8 days) by filtration, centrifuging, decantation or the like, and washed with water until free from alkali. It is then stirred with sulphuric acid of 1–10 per cent strength, again filtered or centrifuged, washed free from sulphuric acid and dried, either at reduced pressure or in the air.

After drying and comminution the product is a more or less fine and sandy or flocculent powder, which has the following solubility properties: It dissolves in alcohol of 96 per cent strength, a mixture of alcohol and ether (for instance 2:1), acetone, particularly in presence of small proportions of water, a mixture of ligroin and alcohol (for example 1:1 or 1:2), a mixture of hexane and alcohol, in chloroform, alcohol-chloroform mixture, carbon tetrachloride-alcohol mixture, methyl-acetate, methylalcohol, methylalcohol-methylacetate mixture, methylalcohol-chloroform mixture, benzole-alcohol mixture, glacial acetic acid, di-ethylaniline-alcohol mixture, quinoline, α-dichlorhydrin, tetrachlorethane-alcohol mixture, nitromethane-alcohol mixture, acetylene-dichloride-alcohol mixture, pyridine, amyl-acetate-alcohol mixture, ethylene-chlorhydrin, benzyl-alcohol, mixtures of alcohol with amyl-acetate, with ethyl-benzoate, with chlorobenzene, with ethylene-chloride, with ethyl-citrate, with ethyl-naphthol, with ethylen-bromide, with amyl-alcohol, with chloro-naphthalene, dibenzyl-ether, allyl-alcohol, acetylene-acetone, eugenol, ethyl-lactate, α-picoline, epichlorhydrin, ortho-chlorophenol and the like. The solutions in volatile solvents, such as benzole-alcohol mixture or methyl-alcohol-methylacetate mixture or chloroform-alcohol mixture or the like, may be worked up in admixture with a plasticizer such as camphor, phosphoric acid esters of phenols, for instance triphenylphosphate or tricresylphosphate and the like to films or artificial threads, in short to all artificial materials, by evaporating the solvent or by precipitation by means of a suitable precipitant, such as water, salt solution or the like.

Ultimate analysis gives the following figures:

| Calculated for: $C_6H_5.N:C\begin{smallmatrix}O.(C_{12}H_{19}O_9.C_2H_5)\\S.C_2H_5\end{smallmatrix}$ $=C_{25}H_{33}NSO_{10}$ | or for: $=C_6H_5.N:C\begin{smallmatrix}O.(C_{12}H_{17}O_9.2C_2H_5)\\S.C_2H_5\end{smallmatrix}$ $=C_{25}H_{37}NSO_{10}$ | Found: |
|---|---|---|
| C = 53.59 per cent. | 55.25 per cent. | 53.93 per cent. |
| H = 6.4 per cent. | 6.81 per cent. | 7.22 per cent. |
| N = 2.71 per cent. | 2.57 per cent. | 2.35 per cent. |
| S = 6.21 per cent. | 5.89 per cent. | 6.23 per cent. |

Assuming that the nitrogen content is to be attributed to the presence of some impurities (which is improbable because even after redissolving the substance three or four times in benzene-alcohol mixture (1:1) and precipitating with ether, the body thus purified still contains nearly the same proportion of nitrogen), the foregoing figures would approximate a neutral thiolcarbonic-acid-ethyl-ester of cellulose, in the cellulose component ($C_{12}$complex) of which four or five hydroxyl-hydrogens have been exchanged for ethyl-groups, that is to say

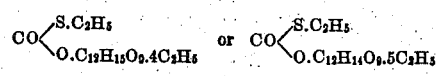

*Example II.*—100 parts of a phenyl- or tolyl-thiourethane, made according to Example 1 or 2 or 6 (in the latter case without neutralizing the viscose or reaction mixture at all) of patent application Ser. No. 727,805, are dissolved in 4900 parts of a caustic soda solution of 10 per cent strength. The solution, filtered or strained if necessary, is mixed with 300–400 parts of di-ethyl sulphate and the whole stirred or shaken. After about half an hour or an hour the final product of the reaction is precipitated. The reaction mixture is allowed to stand at room temperature for about 8 days and after this time the product of the reaction is separated from the mother liquor by filtration, centrifuging, decantation or the like, and washed with water until free from alkali and worked up in the manner described in Example I.

The final product has properties and solubility relationships which are more or less the same as those of the product obtained in accordance with Example I.

*Example III.*—100 parts of a phenyl- or tolyl-thiourethane, made according to Example 1 or 2 or 6 (in the latter case without neutralizing the viscose or reaction mixture at all) of application Ser. No. 727,805, are dissolved in 900 to 1900 parts of a caustic soda solution of 10 per cent strength. The solution, filtered or strained if necessary, is mixed with 200–300 parts of di-ethyl sulphate and the whole continually kneaded. After about half an hour or an hour the final product of the reaction is precipitated. The reaction mixture is allowed to stand at room temperature for about 2 to 8 days and after this time the product of the reaction is separated from the mother liquor by filtration, centrifuging, decantation or the like, and washed with water until free from alkali and worked up in the manner described in Example I.

The final product has properties and solubility relationships which are more or less the same as those of the product obtained in accordance with Example I.

*Example IV.*—Mode of operation as in the previous examples, with the difference that, from the beginning and until the precipitation of the final product takes place, the reaction mixture is cooled to 0° to 4° C.

The cooling has the effect that even smaller quantities of di-ethyl sulphate suffice to produce a final product soluble in volatile solvents.

*Example V.*—100 parts of a phenyl- or tolyl-thiourethane, made according to Example 1 or 2 or 6 (in the latter case without neutralizing the viscose or reaction mixture at all) of patent application Ser. No. 727,805, are dissolved in 4900 parts of a caustic soda solution of 1–3 per cent strength. The solution, filtered or strained if necessary, is mixed with 200–250 parts of di-ethyl sulphate and the whole stirred or shaken. After about half an hour or an hour the final product of the reaction is precipitated. The reaction mixture is then worked up in the manner described in Example I. The final product of the reaction is soluble in dilute alkali solution, for example caustic soda solution of 10 per cent strength, in aqueous alcohol and in acetic acid of 60–80 per cent strength. Also in aqueous pyridine and in aqueous solutions of organic bases.

*Example VI.*—100 parts of a phenyl- or tolyl-thourethane, made in accordance with Example 1 or 2 of patent application Ser. No. 727,805, are dissolved in 4900 parts of caustic soda solution of 5–10 per cent strength and the solution, filtered or strained as may be necessary, is heated on the water-bath to 40–50° C. 600–1000 parts of di-ethyl sulphate are added and the whole is stirred or shaken. After some minutes the final product of the reaction separates. The mixture is worked up as described in Example I, either immediately or after it has been further heated for some hours at 50–60° C.

The final product resembles closely in its properties and solubility relationships that obtained as described in Example I.

In the foregoing examples there may be substituted for the caustic soda solution of 1–10 per cent strength, a stronger solution, for example one of 20–50 per cent strength. It is also possible to start with more concentrated thiourethane solutions, for example solutions of 20 per cent strength in weaker or stronger caustic soda solution. If more concentrated solutions of the N-substituted or not substituted thiourethanes in caustic soda solutions of, say, 10 to 20 per cent are employed, products with properties as described in Example I are obtained even with smaller quantities of di-ethyl sulphate.

Instead of di-ethyl sulphate there may be used another di-alkyl sulphate, for example di-methyl sulphate or a halogenalkyl or halogen-aralkyl, such as ethyliodide, methyl iodide, ethyl bromide, methyl bromide, benzyl chloride or the like. If the ester selected has a low boiling point and it is desired to operate at a temperature above this boiling point, the operation would be conducted according to the boiling point, either in a reflux apparatus or in a closed vessel or pressure vessel, such as an autoclave.

*Example VII.*—100 parts of a phenyl- or tolyl-thiourethane, made as described in Example 1 or 2 of patent application Ser. No. 727,805, are introduced into a cooled, energetically acting mixing apparatus, such as a kneading machine, a breaker or a mill, and 125 parts of powdered caustic soda are added in small portions. The temperature of the mixture is maintained at 5–10° centigrade. When the mass has become uniform the kneading or rubbing is interrupted. The final weight of the mass amounts to 300–320 parts, that is to say the mass has absorbed 75–95 parts of water (obviously the operation may be such that a mixture of 125 parts of solid caustic soda with 75–95 parts of water is introduced into the mixing apparatus and the mixing conducted with exclusion of air).

The final product of the mixing is introduced into an autoclave either immediately after the mixing or after it has been allowed to rest for a longer or shorter period; the autoclave should be movable or be provided with a stirring device; 200 parts of previously cooled ethyl-chloride are added, the autoclave is closed and then heated in such a manner that the temperature of the mass attains 95–100° C. after 1–4 hours. At this temperature the mixture is kept with continuous movement or stirring for 6–15 hours.

The cooled autoclave is opened and the mixture, if necessary, broken up; it is then most thoroughly washed with cold or hot water and worked up in the manner described in Example I.

The final product has properties and solubility relationships which are more or less the same as those of the product obtained in accordance with Example I.

*Example III.*—The mode of operation resembles that described in Example VII, but with the difference that only 80–100 parts of caustic soda and correspondingly 125–160 parts of ethyl-chloride are used.

In all foregoing examples there may be substituted for the phenyl- or tolyl-thiourethane of cellulose another aryl-thiourethane, or an aralkyl-thiourethane, such as a benzyl-thiourethane or an aliphatic thiourethane, such as mono- or di-methyl- or ethyl-thiourethane, or a not substituted thiourethane.

The expression "N-substituted or not-substituted thiourethanes of cellulose" in this specification and its claim means thiourethanes or N-alkyl- or N-aralkyl- or N-arylthiourethanes of the cellulose group, of which the cellulose component or components are either cellulose itself or a conversion product of cellulose, or a cellulose compound, for example those products which are obtained when ammonia or compounds derived from ammonia, in which at least one hydrogen atom of the ammonia has been exchanged for an alcohol radical, are allowed to act on a cellulose xantho-fatty acid, that is to say products which can be obtained by bringing together viscose and a mono-halogen fatty acid or a salt thereof.

In this specification and in the following claims, the term an alcohol radical is to be understood as including the saturated or unsaturated organic complex which remains if the hydroxyl group be taken away from a monohydroxylic alcohol or one or more hydroxyl groups be taken away from a dihydroxylic or polyhydroxylic alcohol.

I claim:

1. A process of making cellulose derivatives, which process comprises causing an ester of an inorganic acid to act upon a salt of a thiourethane of the cellulose group.

2. A process of making cellulose derivatives, which process comprises causing an ester of an inorganic acid to act upon an alkali metal salt of a thiourethane of the cellulose group.

3. A process of making cellulose derivatives, which process comprises causing an inorganic acid ester to act upon a salt of an N-substituted thiourethane of the cellulose group.

4. A process of making cellulose derivatives, which process comprises causing an inorganic acid ester to act upon an alkali metal salt of an N-substituted thiourethane of the cellulose group.

5. A process of making cellulose derivatives, which process comprises causing an inorganic acid ester to act upon a thiourethane of the cellulose group in presence of an alkali.

6. A process of making cellulose derivatives, which process comprises causing an ester of an inorganic acid to act upon an N-substituted thiourethane of the cellulose group in presence of an alkali.

7. A process of making cellulose derivatives which comprises causing an ester of an inorganic acid to act upon a solution of a thiourethane of the cellulose group in an alkali.

8. A process of making cellulose derivatives which comprises causing an ester of an inorganic acid to act upon a solution of an N-substituted thiourethane of the cellulose group in an alkali.

9. A process of making cellulose derivatives, which process comprises causing an ester of an inorganic acid to act upon a thiourethane of the cellulose group in presence of water and an alkali in such manner that at least a part of the alkali is undissolved.

10. A process of making cellulose derivatives, which process comprises causing an ester of an inorganic acid to act upon a salt of a thiourethane of the cellulose group in presence of water and an alkali in such manner that at least a part of the alkali is undissolved.

11. A process of making cellulose derivatives, which process comprises causing an ester of an inorganic acid to act upon an N-substituted thiourethane of the cellulose group in presence of water and an alkali in such manner that at least a part of the alkali is undissolved.

12. A process of making cellulose derivatives, which process comprises causing an ester of an inorganic acid to act upon a salt of an N-substituted thiourethane of the cellulose group in presence of water and an alkali in such manner that at least a part of the alkali is undissolved.

13. A process of making cellulose derivatives, which process comprises causing an ester of an inorganic acid to act upon a salt of an aryl-thiourethane of the cellulose group.

14. A process of making cellulose derivatives, which process comprises causing an ester of an inorganic acid to act upon a solution of an aryl-thiourethane of the cellulose group in an alkali.

15. A process of making cellulose derivatives, which process comprises causing an ester of an inorganic acid to act upon an aryl-thiourethane of the cellulose group in presence of water and an alkali in such manner that at least a part of the alkali is undissolved.

16. A process of making cellulose derivatives, which process comprises causing an ester of an inorganic acid to act upon a salt of an aryl-thiourethane of the cellulose group in presence of water and an alkali in such manner that at least a part of the alkali is undissolved.

17. A process of making cellulose derivatives, which process comprises causing an ester of an inorganic acid to act upon a salt of a phenyl-thiourethane of the cellulose group.

18. A process of making cellulose derivatives, which process comprises causing an ester of an inorganic acid to act upon a solution of a phenyl-thiourethane of the cellulose group in an alkali.

19. A process of making cellulose derivatives, which process comprises causing an ester of an inorganic acid to act upon a phenyl-thiourethane of the cellulose group in presence of water and an alkali in such manner that at least a part of the alkali is undissolved.

20. A process of making cellulose derivatives, which process comprises causing an ester of an inorganic acid to act upon a salt of a phenyl-thiourethane of the cellulose group in presence of water and an alkali in such manner that at least a part of the alkali is undissolved.

21. As new products, esters of thiourethanes of the cellulose group.

22. As new products, alkyl esters of thiourethanes of the cellulose group.

23. As new products, ethyl esters of thiourethanes of the cellulose group.

24. As new products, esters of thiourethanes of the cellulose group in which thiourethanes at least one hydrogen atom of the amido group is replaced by an alcohol radical.

25. As new products, esters of thiourethanes of the cellulose group in which thiourethanes at least one hydrogen atom of the amido group is replaced by an aryl group.

26. As new products, esters of thiourethanes of the cellulose group in which thiourethanes at least one hydrogen atom of the amido group is replaced by a phenyl group.

27. As new products, alkyl esters of thiourethanes of the cellulose group in which thiourethanes at least one hydrogen atom of the amido group is replaced by an aryl group.

28. As new products, ethyl esters of thiourethanes of the cellulose group in which thiourethanes at least one hydrogen atom of the amido group is replaced by an aryl group.

29. As new products, alkyl esters of thiourethanes of the cellulose group in which thiourethanes at least one hydrogen atom of the amido group is replaced by a phenyl group.

30. As new products, ethyl esters of thiourethanes of the cellulose group in which thiourethanes at least one hydrogen atom of the amido group is replaced by a phenyl group.

31. As new products, esters of thiourethanes of the cellulose group in which thiourethanes at least one hydroxyl-hydrogen atom of the cellulose component is replaced by an alcohol radical.

32. As new products, esters of thiourethanes of the cellulose group in which thiourethanes at least one hydroxyl-hydrogen atom of the cellulose component is replaced by an alkyl group.

33. As new products, esters of thiourethanes of the cellulose group in which thiourethanes at least one hydroxyl-hydrogen atom of the cellulose component is replaced by an ethyl group.

34. As new products, esters of thiourethanes of the cellulose group in which thiourethanes at least one hydrogen atom of the amido group is replaced by an alcohol radical and at least one hydroxyl-hydrogen atom of the cellulose component is replaced by an alcohol radical.

35. As new products, esters of thiourethanes of the cellulose group in which thiourethanes at least one hydrogen atom of the amido group is replaced by an aryl group and at least one hydroxyl-hydrogen atom of the cellulose component is replaced by an alkyl group.

36. As new products, esters of thiourethanes of the cellulose group in which thiourethanes at least one hydrogen atom of the amido group is replaced by a phenyl group and at least one hydroxyl-hydrogen atom of the cellulose component is replaced by an ethyl group.

37. As new products, cellulose compounds containing sulphur which dissolve in volatile solvents which are not basic in character.

38. As new products, cellulose compounds containing sulphur and nitrogen which dissolve in volatile solvents which are not basic in character.

39. As new products, cellulose compounds containing sulphur which dissolve in benzol-alcohol mixture, methyl-alcohol-methylacetate mixture, and alcohol-acetone mixture.

40. As new products, cellulose compounds containing sulphur and nitrogen which dissolve in benzol-alcohol mixture, methyl-alcohol-methylacetate mixture, and alcohol-acetone mixture.

41. As new products, artificial materials, which consist of an ester of a thiourethane of the cellulose group.

42. As new products, artificial materials, which contain an ester of a thiourethane of the cellulose group.

43. As new products, artificial materials, which consist of an ester of a thiourethane of the cellulose group in which thiourethane at least one hydrogen atom of the amido group is replaced by an alcohol radical.

44. As new products, artificial materials, which contain an ester of a thiourethane of the cellulose group in which thiourethane at least one hydrogen atom of the amido group is replaced by an alcohol radical.

45. As new products, artificial materials, which consist of an ester of a thiourethane of the cellulose group in which thiourethane at least one hydrogen atom of the amido group is replaced by an alcohol radical and at least one hydroxyl-hydrogen atom of the cellulose component is replaced by an alcohol radical.

46. As new products, artificial materials, which contain an ester of a thiourethane of the cellulose group in which thiourethane at least one hydrogen atom of the amido group is replaced by an alcohol radical and at least one hydroxyl-hydrogen atom of the cellulose component is replaced by an alcohol radical.

47. The process of making cellulose derivatives which comprises reacting with an ester of an inorganic acid upon a derivative of a cellulose thiourethane obtained by reacting upon a cellulose thiourethane with an alkali.

48. The process of making cellulose derivatives which comprises reacting with an ester of an inorganic acid upon a derivative of a cellulose thiourethane obtained by reacting upon a cellulose thiourethane with a hydroxide of an alkali metal.

49. The process of making cellulose derivatives which comprises reacting with an ester of an inorganic acid upon a derivative of an N-substituted thiourethane of cellulose obtained by reacting upon an N-substituted thiourethane of cellulose with a hydroxide of an alkali metal.

In testimony whereof I affix my signature.

LEON LILIENFELD.